United States Patent

Tomlinson et al.

Patent Number: 5,218,949
Date of Patent: Jun. 15, 1993

[54] SAWS

[76] Inventors: Peter N. Tomlinson, 315 Enford Road, Mondeor, Johannesburg, Transvaal; Aulette Stewart, 45 Arend Avenue, Randburg, Transvaal, both of South Africa

[21] Appl. No.: 890,385

[22] Filed: May 26, 1992

Related U.S. Application Data

[63] Continuation of Ser. No. 671,361, Mar. 19, 1991, abandoned.

[30] Foreign Application Priority Data

Mar. 19, 1990 [ZA] South Africa ............... 90/2092

[51] Int. Cl.⁵ ............................... B28D 1/08
[52] U.S. Cl. ....................... 125/21; 125/22; 125/15; 51/206 R; 51/206 P; 51/207
[58] Field of Search ........... 51/204, 206 R, 206 P, 51/207, 293, 297, 309, 295; 125/21, 22

[56] References Cited

U.S. PATENT DOCUMENTS

| | | | |
|---|---|---|---|
| 3,074,211 | 1/1963 | Sacco | 51/206 R |
| 3,640,027 | 2/1972 | Weiss | 51/206 R |
| 3,886,926 | 6/1975 | Hall | 125/21 |
| 4,016,857 | 4/1977 | Hall | 125/18 |
| 4,031,878 | 6/1977 | Hall | 125/21 |
| 4,097,246 | 6/1978 | Olson | 125/21 |
| 4,138,228 | 2/1979 | Hartfelt et al. | 51/295 |
| 4,609,380 | 9/1986 | Barnett et al. | 51/295 |
| 4,739,745 | 4/1988 | Browning | 51/206 R |
| 4,856,490 | 8/1989 | Kawase et al. | |

*Primary Examiner*—M. Rachuba
*Attorney, Agent, or Firm*—Scully, Scott, Murphy & Presser

[57] ABSTRACT

A saw comprises a support such as a metallic disc-shaped blank and a working portion bonded to the periphery of the blank. The working portion comprises a mass of abrasive particles held in a polymeric matrix and has a bonding surface through which it is bonded to the support and a working surface. Examples of suitable polymeric matrices are rubber, polyurethane and nylon.

12 Claims, 1 Drawing Sheet

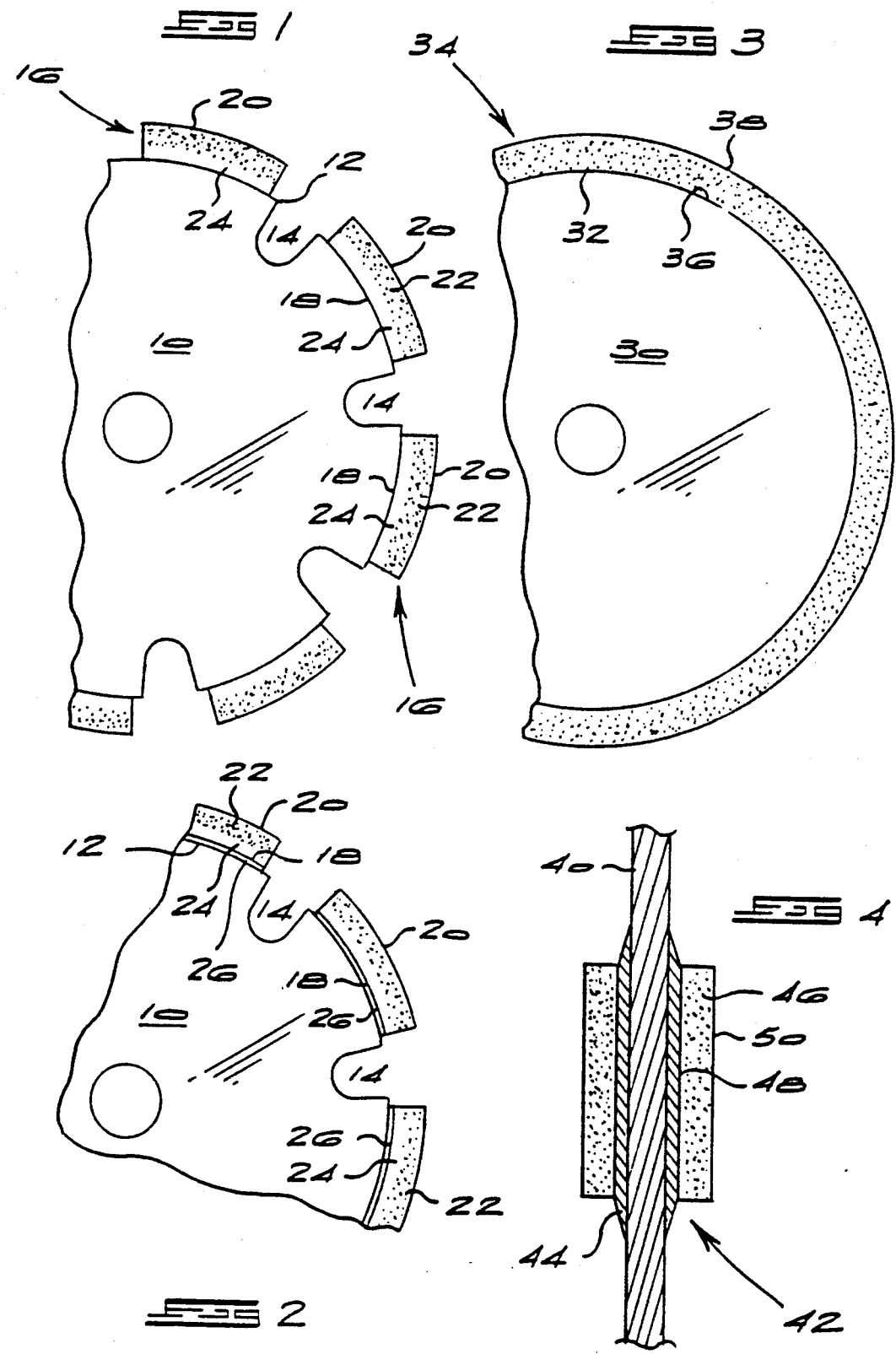

5,218,949

SAWS

This is a continuation of copending application Ser. No. 671,361 filed on Mar. 19, 1991.

BACKGROUND OF THE INVENTION

This invention relates to saws.

Diamond impregnated saws come in a variety of forms. The saw may comprise a blade, the periphery of which is provided with a diamond impregnated layer or a plurality of diamond impregnated segments bonded to the periphery. The diamond impregnated layer or segments consist of a mass of diamond particles held in a metal matrix.

Another type of saw is a wire saw which consists of a wire rope carrying a plurality of sleeves bonded thereto, each sleeve consisting of a metal matrix in which are dispersed a mass of diamond particles. U.S. Pat. No. 4,856,490 describes a wire saw consisting of a wire rope covered by a resilient layer such as rubber with a plurality of sleeves mounted at spaced intervals along the rope. The sleeves have an abrasive layer at their outer periphery and are fixed to the rope. The abrasive layer consists of a mass of abrasive particles held in a metal matrix.

SUMMARY OF THE INVENTION

According to the present invention, a saw comprises a support and a working portion, the working portion comprising a mass of abrasive particles held in a polymeric matrix and having a bonding surface through which it is bonded to the support and a working surface.

DESCRIPTION OF THE DRAWINGS

FIGS. 1 to 4 illustrate schematic sectional side views of portions of four saw blade embodiments of the invention.

DESCRIPTION OF EMBODIMENTS

The abrasive particles will generally be ultra-hard abrasive particles such as diamond or cubic boron nitride. The abrasive particles may also be polycrystalline in nature such as those obtained by crushing an abrasive compact. The particles will vary in size over a wide range, generally from 150 to 900 microns. Typically, the particles will have a size in the region of about 300 microns. The particles may be provided with a metal or other coating to assist in bonding them to the polymeric matrix.

The polymeric matrix may, for example, be rubber, polyurethane, nylon or like material. The polymeric matrix will have sufficient hardness to enable it to be formed into the working portion and strength to hold the abrasive particles and allow them to perform their cutting action during sawing. The polymeric matrix must retain sufficient strength at the temperatures encountered during sawing to hold the abrasive particles therein. Generally, a cooling medium will be applied generously during cutting to ensure that the sawing temperature is kept as low as possible.

The abrasive particles may be uniformly distributed through the polymeric matrix. Alternatively, and preferably, the working portion may comprises two zones, a first zone adjacent the working surface being rich in abrasive particles and a second zone, adjacent the bonding surface, being lean in abrasive particles. Preferably, the lean zone contains no abrasive particles at all.

The concentration of abrasive particles in the working portion will generally be in the range 5 to 20 percent by volume.

In one form of the invention, the support comprises a metallic disc-shape blank and the working portion comprises a plurality of segments, each of which is bonded to the periphery of the blank.

In another form of the invention, the support comprises a metallic disc-shaped blank and the working portion comprises a continuous strip or layer which is bonded to the periphery of the blank.

In the above two forms of the invention, the blank will typically be a steel blank. To improve the bonding of the polymeric matrix to the steel or other metallic blank, a suitable bonding metal layer may be provided between the bonding surface of the working portion and the blank. An example of a suitable metal bonding layer is a brass bonding layer.

In yet another form of the invention, the support is a wire and the working portion comprises a plurality of sleeves each of which is secured to the wire through a metallic supporting sleeve.

Embodiments of the invention will now be described with reference to the accompanying drawings. Referring first to FIG. 1, a saw blade comprises a steel blank 10 having a periphery 12. Formed in the periphery 12 are a series of recesses 14. The recesses 14 provide passages for cooling medium during sawing.

A plurality of segments 16 are secured to the periphery 12 of the blank in spaced relationship. Each segment has a bonding surface 18 and an opposite working surface 20. Each segment further comprises a polymeric matrix containing a mass of discrete abrasive particles. The abrasive particles are uniformly distributed in a first zone 22 which is adjacent the working surface 20. Each segment further comprises a second zone 24 which contains no abrasive particles. This second zone is adjacent the bonding surface 18. In use, the working surface performs the cutting action. The polymeric matrix will wear away during sawing in a similar manner to a conventional metal matrix. There is no real purpose in having abrasive particles, which are expensive, in the second zone for they perform no cutting action in this zone.

FIG. 2 illustrates a second embodiment of the invention which is similar to that of the FIG. 1 embodiment and like parts carry like numerals. The difference in this embodiment is the manner in which the individual segments are bonded to the periphery 12 of the blank 10. Bonding in this embodiment is achieved through a metallic bonding Layer 26. This metallic bonding layer will typically be thin, e.g. less than 500 microns thickness.

FIG. 3 illustrates a third embodiment of a saw blade. Referring to this figure, a saw blade comprises a metallic blank 30 having a periphery 32. Bonded to the periphery 32 is a continuous strip or layer 34. The layer 34 is bonded to the periphery 32 through a bonding surface 36. The rim also has a working surface 38. The rim comprises a mass of abrasive particles uniformly distributed in a polymeric matrix. In this embodiment, the particles are uniformly distributed throughout the matrix. However, as mentioned above, there are economic advantages in making the rim in two zones similar to the FIGS. 1 and 2 embodiments.

Sawing with a saw blade of the type described above carries with it the advantage that its working portion is flexible which enables it to deflect away from, or deviate through, formations of varied hardness. This facilitates continuous sawing making for a more efficient operation and avoiding damage which could be suffered by rigid blades on encountering such non-homogeneous formations. A fourth embodiment of the invention is illustrated by FIG. 4. Referring to this figure, a wire saw comprises a wire or rope 40 carrying a plurality of abrasive elements 42. Each abrasive element comprises a metallic sleeve 44 swaged or otherwise secured to the rope 40. Carried on each sleeve and secured to it is a sleeve-shaped working portion 46. The sleeve-shaped working portion comprises a bonding surface 48 and a working surface 50. The working portion comprises a mass of abrasive particles uniformly distributed through the matrix. As with the other embodiments, the working portion may comprise two zones.

The wire may be made of a metal or a light, flexible and strong fibrous material such as that sold under the trade name Kevlar ®. Kevlar ® has the advantage that its great stength allows it to be used as a thin rope leading to a reduction in the wastage of rock being sawn. Further, the flexibility of the material allows the radial curvature of the rope to exceed the curvature of conventional metal wire. A continuous rubber or like resilient layer may be provided between the rope and the abrasive elements.

In another form of the invention, a wire saw may comprise a wire as illustrated in FIG. 4 having a continuous sleeve bonded to it, the sleeve comprising a mass of abrasive particles held in a polymeric matrix.

The various working portions of the saws described above, i.e. the saw segments 16, rim 34 and abrasive sleeves 46, may be made by extrusion moulding or by press moulding. Where two zones are provided, the preferred method is press moulding where the two zones can be located in the mould, for example, in a green state and then pressed to the desired form. No clearly identifiable interface between the two zones will be evident.

We claim:

1. A saw comprising a metallic support and a working portion, the working portion comprising a mass of abrasive particles held in a polymeric matrix and having a bonding surface and a working surface, said bonding surface being secured to the metallic support through a metallic bonding layer.

2. A saw according to claim 1 wherein the polymeric matrix is selected from rubber, polyurethane and nylon.

3. A saw according to claim 1 wherein the abrasive particles are uniformly distributed through the polymeric matrix.

4. A saw according to claim 1 wherein the working portion comprises two zones, a first zone adjacent the working surface being rich in abrasive particles and a second zone, adjacent the bonding surface, being lean in abrasive particles.

5. A saw according to claim 4 wherein the second zone contains no abrasive particles.

6. A saw according to claim 1 wherein the concentration of abrasive particles in working portion is in the range 5 to 20 percent by volume.

7. A saw according to claim 1 wherein the particles have a size in the range 150 to 900 microns.

8. A saw according to claim 1 wherein the abrasive particles are selected from diamond and cubic boron nitride.

9. A saw according to claim 1 wherein the support comprises a metallic disc-shaped blank and the working portion comprises a plurality of segments, each of which is bonded to the periphery of the blank.

10. A saw according to claim 1 wherein the support comprises a metallic disc-shaped blank and the working portion comprises a continuous strip which is bonded to the periphery of the blank.

11. A saw according to claim 1 wherein the support is a wire and the working portion comprises a plurality of sleeves each of which is secured to the wire through a metallic supporting sleeve.

12. A saw according to claim 1 wherein the metallic bonding layer is a brass bonding layer.

* * * * *